United States Patent
Park et al.

(10) Patent No.: US 9,812,688 B2
(45) Date of Patent: Nov. 7, 2017

(54) SEPARATOR AND RECHARGEABLE LITHIUM BATTERY INCLUDING THE SAME

(71) Applicant: Samsung SDI Co., Ltd., Yongin-si, Gyeonggi-do (KR)

(72) Inventors: Sam-Jin Park, Yongin-si (KR); Ihn Kim, Yongin-si (KR); Jung-Ock Yeou, Yongin-si (KR); Kwi-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 279 days.

(21) Appl. No.: 14/210,290

(22) Filed: Mar. 13, 2014

(65) Prior Publication Data

US 2014/0272532 A1    Sep. 18, 2014

(30) Foreign Application Priority Data

Mar. 13, 2013 (KR) .......................... 10-2013-0026802
Dec. 23, 2013 (KR) .......................... 10-2013-0161728

(51) Int. Cl.
*H01M 2/16* (2006.01)
*H01M 10/0525* (2010.01)
(Continued)

(52) U.S. Cl.
CPC .......... *H01M 2/166* (2013.01); *H01M 2/168* (2013.01); *H01M 2/1686* (2013.01); *H01M 2/1613* (2013.01); *H01M 2/1653* (2013.01); *H01M 10/0525* (2013.01); *H01M 10/0567* (2013.01); *H01M 10/0569* (2013.01)

(58) Field of Classification Search
CPC ....................................................... H01M 2/14
See application file for complete search history.

(56) References Cited

U.S. PATENT DOCUMENTS 6,024,773 A    2/2000   Inuzuka et al.
6,051,342 A    4/2000   Hamano et al.
(Continued)

FOREIGN PATENT DOCUMENTS

CN    85108131 A    5/1987
CN    1251214 A     4/2000
(Continued)

OTHER PUBLICATIONS

EPO Search Report dated Jun. 3, 2014, for corresponding European Patent application 14159669.2, (6 pages).

(Continued)

*Primary Examiner* — Scott J Chmielecki
(74) *Attorney, Agent, or Firm* — Lewis Roca Rothgerber Christie LLP

(57) ABSTRACT

Disclosed are porous substrate and a coating layer positioned on one side or both sides of the porous substrate, wherein the coating layer includes a filler (A) having an average particle diameter of about 0.3 μm to about 2 μm; and a binder (B) including an organic polymer and an inorganic particle, an organic particle, or a combination thereof, wherein an average particle diameter of each of the inorganic particle and the organic particle is about 5 nm to about 200 nm, and a rechargeable lithium battery including the separator.

16 Claims, 1 Drawing Sheet

(51) Int. Cl.
H01M 10/0567 (2010.01)
H01M 10/0569 (2010.01)

(56) References Cited

U.S. PATENT DOCUMENTS

| | | | |
|---|---|---|---|
| 6,387,565 | B1 | 5/2002 | Aihara et al. |
| 6,432,586 | B1 | 8/2002 | Zhang |
| 8,277,897 | B2 | 10/2012 | Uetani et al. |
| 8,405,957 | B2 | 3/2013 | Katayama et al. |
| 2002/0018930 | A1 | 2/2002 | Hamano et al. |
| 2003/0087170 | A1* | 5/2003 | Glicksman ............ G03F 7/0047 430/18 |
| 2007/0264577 | A1* | 11/2007 | Katayama ............. H01M 2/162 429/246 |
| 2010/0015530 | A1* | 1/2010 | Katayama ................ H01G 9/02 429/246 |
| 2010/0285348 | A1 | 11/2010 | Murata et al. |
| 2010/0316903 | A1* | 12/2010 | Kim .................... H01M 2/1653 429/145 |
| 2011/0052987 | A1* | 3/2011 | Katayama ........... H01M 2/1646 429/221 |
| 2011/0229768 | A1 | 9/2011 | Pan et al. |
| 2011/0256443 | A1 | 10/2011 | Park et al. |
| 2012/0301774 | A1* | 11/2012 | Jiang ..................... H01M 2/145 429/144 |
| 2013/0101886 | A1* | 4/2013 | Jung ........................ H01M 2/16 429/144 |
| 2013/0149587 | A1 | 6/2013 | Yu et al. |
| 2013/0202944 | A1* | 8/2013 | Song .................. H01M 2/1606 429/144 |
| 2013/0302661 | A1* | 11/2013 | Kim ..................... H01M 2/145 429/144 |
| 2014/0147726 | A1 | 5/2014 | Toyoda |
| 2014/0287295 | A1* | 9/2014 | Honda .................. H01G 11/52 429/144 |
| 2015/0017510 | A1* | 1/2015 | Terado ................. H01M 2/145 429/144 |

FOREIGN PATENT DOCUMENTS

| | | |
|---|---|---|
| EP | 2 662 912 A1 | 11/2013 |
| JP | 10-172606 A | 6/1998 |
| JP | 10-177865 A | 6/1998 |
| JP | 10-189054 A | 7/1998 |
| JP | 2001-319634 | 11/2001 |
| JP | 2002-008730 A | 1/2002 |
| JP | 2005-100951 A | 4/2005 |
| JP | 2007-157569 A | 6/2007 |
| JP | 2007-157570 A | 6/2007 |
| JP | 2011-071009 A | 4/2011 |
| JP | 2012-020437 A | 2/2012 |
| KR | 10-0856638 B1 | 9/2008 |
| KR | 10-1091228 B1 | 12/2011 |
| WO | WO 2007/066768 A1 | 6/2007 |
| WO | WO 2008/093575 A1 | 8/2008 |
| WO | WO 2012/150838 A2 | 11/2012 |
| WO | WO 2013/005796 A1 | 1/2013 |

OTHER PUBLICATIONS

Korean Patent Abstracts No. 10-2007-0004931 A for Patent No. KR 10-0856638 B1, 2 Pages.
Patent Abstracts of Japan and Machine English Translation of JP 2002-008730 A, 9 Pages.
Patent Abstracts of Japan and Machine English Translation of JP 2007-157569 A, 24 Pages.
Patent Abstracts of Japan and Machine English Translation of JP 2007-157570 A, 38 Pages.
Patent Abstracts of Japan and Machine English Translation of JP 2011-071009 A, 23 Pages.
Patent Abstracts of Japan and Machine English Translation of JP 2012-020437 A, 28 Pages.
EPO Office Action dated Jan. 4, 2017, for corresponding European Patent Application No. 14159669.2 (13 pages).
EPO Office Action dated Aug. 2, 2016, for corresponding European Patent Application 14 159 669.2, (8 pages).
Chinese Office Action, issued in Patent Application No. 201410090128.1, with Machine English Translation, dated May 4, 2017, 20 Pages.

\* cited by examiner

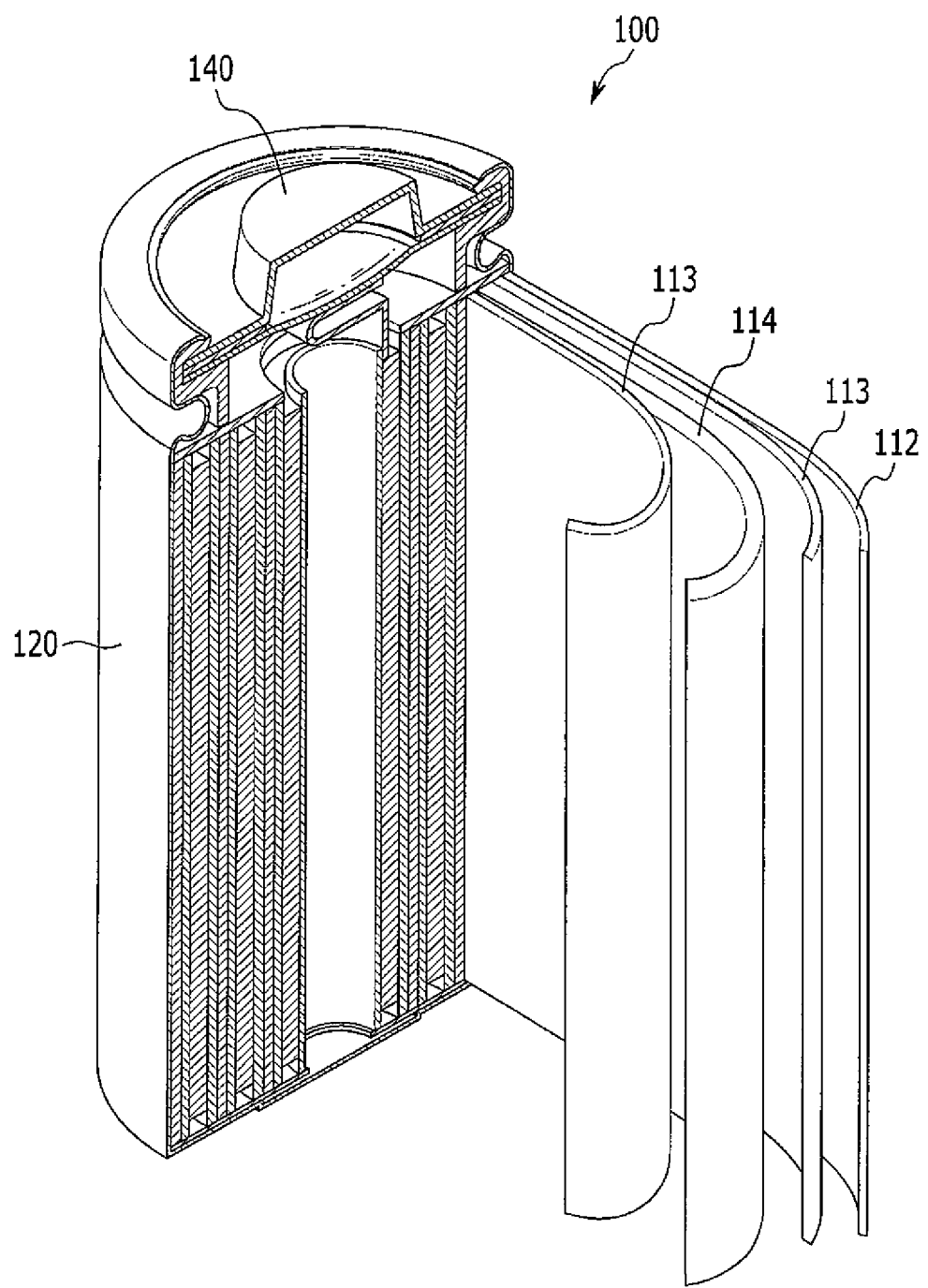

SEPARATOR AND RECHARGEABLE LITHIUM BATTERY INCLUDING THE SAME

CROSS-REFERENCE TO RELATED APPLICATIONS

This application claims priority to and the benefit of Korean Patent Application No. 10-2013-0026802, filed in the Korean Intellectual Property Office on Mar. 13, 2013; and Korean Patent Application No. 10-2013-0161728, filed in the Korean Intellectual Property Office on Dec. 23, 2013, the entire contents of both patent applications are incorporated herein by reference.

BACKGROUND

1. Field

A separator and a rechargeable lithium battery including the separator are disclosed.

2. Description of the Related Art

A conventional non-aqueous rechargeable lithium battery includes a separator made of a porous insulating film and interposed between positive and negative electrodes, and the pores of the film are impregnated by an electrolyte solution including a lithium salt dissolved therein. Such a non-aqueous rechargeable lithium battery has suitable (e.g., excellent) high-capacity and high energy density characteristics.

However, when the positive and negative electrodes therein are repetitively shrunk and expanded during the charge and discharge cycles and thus, react with the separator or the electrolyte solution and the non-aqueous rechargeable lithium battery may be easily deteriorated, have internal and external short circuits, and become hot rapidly. When the battery becomes hot rapidly as described above, the separator may become molten and may rapidly shrink or be destroyed and thus, the rechargeable battery may be short-circuited again.

In order to reduce or prevent this problem, a comparable (conventional) separator is widely formed of a porous polyethylene film having a suitable (e.g., an excellent) shutdown characteristic, being easily handled, and low in cost. Herein, the term "shutdown" refers to an event when a separator is partly fused and thus, its pores are closed and a current is cut off, when a battery is heated up due to overcharge, external or internal short circuit, or the like. In addition, an attempt has been made to improve the safety of the non-aqueous rechargeable lithium battery by improving the heat resistance of an electrode material and a material for the separator and the like, and in particular, to ensure (secure) safety even when the separator therein is sharply shrunk or destroyed.

SUMMARY

An aspect according to one embodiment of the present invention is directed toward a separator having a small amount of residual moisture and a low shrinkage ratio at a high temperature.

An aspect according to another embodiment of the present invention is directed toward a rechargeable lithium battery having suitable (e.g., excellent) cycle-life and safety characteristics.

In one embodiment, a separator including a porous substrate and a coating layer on one side or both sides of the porous substrate is provided. The coating layer includes a filler (A) having an average particle diameter of about 0.3 µm to about 2 µm; and a binder (B) including an organic polymer and an inorganic particle having an average particle diameter of about 5 nm to about 200 nm, an organic particle having an average particle diameter of about 5 nm to about 200 nm, or a combination thereof.

The separator may further include an adhesion layer on the coating layer.

The adhesion layer may include a binder (B); an acrylate-based binder; a rubber-based binder; a diene-based binder; a styrene-based binder; or a combination thereof.

In another one embodiment, a separator includes a porous substrate, a coating layer on one side or both sides of the porous substrate, and an adhesion layer on the coating layer, wherein the coating layer includes a filler (A) having an average particle diameter of about 0.3 µm to about 2 µm and a binder resin, and the adhesion layer includes a binder (B) including an organic polymer and an inorganic particle having an average particle diameter of about 5 nm to about 200 nm, an organic particle having an average particle diameter of about 5 nm to about 200 nm, or a combination thereof.

In the coating layer, the binder resin may include an acrylate-based resin, a rubber-based resin, a diene-based resin, a styrene-based resin, or a combination thereof.

The binder (B) may be a mixture of the organic polymer and the inorganic particle, the organic particle or a combination thereof.

The organic polymer may have a glass transition temperature ($T_g$) of about −50° C. to about 60° C.

The organic polymer may include a diene-based polymer, an acrylate-based polymer, a styrene-based polymer, a urethane-based polymer, a polyolefin-based polymer, or a combination thereof.

The organic particle may include an acrylate-based compound or a derivative thereof, a diallyl phthalate-based compound or a derivative thereof, a polyimide-based compound or a derivative thereof, a urethane-based compound or a derivative thereof, a copolymer thereof, or a combination thereof.

The organic particle may include a cross-linked polymer. For example the organic particle may include cross-linked polymethyl methacrylate (PMMA).

The organic particle may have a glass transition temperature of greater than or equal to about 60° C.

The organic particle may include polyurethane.

The inorganic particle may include $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or a combination thereof.

The binder (B) may include an inorganic particle and an organic polymer, and may further include a binding agent to bind the inorganic particle with the organic polymer. The binding agent may be, for example, a silane coupling agent.

The binding agent may be included in an amount of about 0.03 parts by weight to about 10 parts by weight based on 100 parts by weight of the organic polymer.

In the binder (B), the inorganic particle, the organic particle or a combination thereof may be included in an amount of about 10 parts by weight to about 100 parts by weight based on 100 parts by weight of the organic polymer.

The binder (B) may have a storage modulus at 40° C. of about 50 MPa to about 200 MPa, and a storage modulus at 100° C. of about 30 MPa to about 150 MPa.

The filler (A) may be included in an amount of about 70 wt % to about 99 wt % based on the total amount of the coating layer.

The filler (A) may be an inorganic compound, an organic compound, or a combination thereof.

In the filler (A), the inorganic compound may be alumina, silica, boehmite, magnesia, or a combination thereof.

In the filler (A), the organic compound may include an acrylate-based compound or a derivative thereof, a diallyl phthalate-based compound or a derivative thereof, a polyimide-based compound or a derivative thereof, a polyurethane-based compound or a derivative thereof, a copolymer thereof, or a combination thereof.

The filler (A) may have a plate shape.

The filler (A) may have an aspect ratio of about 1:5 to about 1:100.

The filler (A) may have a length ratio of a long axis relative to a short axis of about 1 to about 3.

An average angle of a flat surface of the filler (A) relative to one side of the porous substrate may be about 0 to about 30 degrees.

The filler (A) may have a structure where a primary particle is aggregated to form a secondary particle.

The coating layer may have a thickness of about 0.1 μm to about 5 μm.

The porous substrate may be a glass fiber, polyester, TEFLON® (tetrafluoroethylene), polyolefin, polytetrafluoroethylene (PTFE), polyacrylonitrile, or a combination thereof.

The separator may have a thickness of about 5 μm to about 30 μm.

In another embodiment, a rechargeable lithium battery includes a positive electrode including a positive active material; a negative electrode including a negative active material; a non-aqueous electrolyte; and the above described separator positioned between the positive electrode and the negative electrode.

Hereinafter, further embodiments of the present invention will be described in more detail.

The separator for a rechargeable lithium battery according to one embodiment has a small amount of residual moisture and a low shrinkage ratio at a high temperature. The rechargeable lithium battery including the separator has suitable (e.g., excellent) cycle-life and safety characteristics.

BRIEF DESCRIPTION OF THE DRAWING

The drawing is a schematic view showing a rechargeable lithium battery according to one embodiment.

DETAILED DESCRIPTION

Hereinafter, embodiments are described in more detail. However, these embodiments are examples, and this disclosure is not limited thereto.

As used herein, when a definition is not otherwise provided, the term "alkyl group" refers to "a saturated alkyl group" without any alkenyl group or alkynyl group. The alkyl group may be branched, linear or cyclic.

The alkyl group may be a C1 to C20 alkyl group, and in one embodiment, a C1 to C10 alkyl group, for example, a C1 to C6 lower alkyl group, a C7 to C10 medium-sized alkyl group, or a C11 to C20 higher alkyl group.

Examples of the alkyl group may be a methyl group, an ethyl group, a propyl group, an isopropyl group, a butyl group, an isobutyl group, a t-butyl group, a pentyl group, a hexyl group, a cyclopropyl group, a cyclobutyl group, a cyclopentyl group, a cyclohexyl group, and the like.

The term "aromatic group" refers to a cyclic substituent all elements of which have conjugated p-orbitals. Examples of the aromatic group may be an aryl group and a heteroaryl group.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In one embodiment, a separator including a porous substrate and a coating layer positioned on one side or both sides of the porous substrate is provided. The coating layer includes a filler (A); and a binder (B) including an inorganic particle, an organic particle, or a combination thereof, and an organic polymer.

The separator has a small amount of residual moisture, a low shrinkage ratio at a high temperature, and a suitable (e.g., an excellent) heat resistance. Accordingly, a battery including the separator may reduce or prevent a short circuit between the positive and negative electrodes and ensure (secure) the battery stability.

The separator may further include an adhesion layer positioned on the coating layer.

That is, the separator may include a porous substrate, a coating layer positioned on one side or both sides of the porous substrate, and an adhesion layer positioned on the coating layer.

In this case, the coating layer includes the filler (A), and at least one of the coating layer and the adhesion layer includes the binder (B) including the inorganic particle, the organic particle, or a combination thereof, and the organic polymer.

The binder (B) including the inorganic particle, the organic particle, or a combination thereof, and the organic polymer may be included in one of the coating layer and the adhesion layer, or both the coating layer and the adhesion layer. In any case, the separator may have the effects of suitable (e.g., excellent) heat resistance, a small amount of residual moisture, and a low shrinkage ratio at a high temperature.

In the application, an average particle diameter is defined as the number average particle diameter. For example, the number average particle diameter may be measured by a laser-scattering particle distribution system (e.g., LA-920 manufactured by Horiba Ltd.).

Hereinafter, each constituent element is described.

(A) Filler

The filler (A) may play the role of a support in the separator. When the separator is shrunk at a high temperature, the filler (A) may support the separator and suppress shrinkage of the separator. In addition, the separator including the filler (A) may have (secure) a sufficient porosity and improved mechanical characteristics. A rechargeable lithium battery including the separator may have (secure) a suitable (e.g., excellent) stability.

The filler (A) may have an average particle diameter of about 0.3 μm to about 2 μm. For example, the filler may have an average particle diameter of about 0.3 μm to about 1.5 μm, or about 0.3 μm to about 1.0 μm. When the filler (A) has an average particle diameter within the range, a coating layer including the filler (A) may have an appropriate thickness, and a separator including the filler (A) may have an appropriate porosity.

The filler (A) may be included in an amount of about 70 parts by weight to about 99 parts by weight based on 100 parts by weight of the coating layer. For example, it may be included in an amount of about 71 parts by weight to about 99 parts by weight, about 70 parts by weight to about 90 parts by weight, about 80 parts by weight to about 99 parts by weight, about 80 parts by weight to about 90 parts by weight, or about 90 parts by weight to 99 parts by weight. When the filler is included within the range, a separator including the filler may have (secure) a suitable (e.g., excellent) porosity and sufficient adherence.

The filler (A) may be an inorganic compound, an organic compound, or a combination thereof.

The inorganic compound may be a metal oxide, a semi-metal oxide, or a combination thereof. For example, the inorganic compound may be alumina, silica, boehmite, magnesia, or a combination thereof. The alumina, silica, and the like may have a small particle size and may be easily prepared as a dispersion.

The inorganic compound may have a sphere or a plate shape. Examples of a plate-shaped inorganic compound include alumina, boehmite, and the like. Here, a separator including such a compound may be further suppressed from area shrinkage at a high temperature and secure relatively high porosity and thus, improve the penetration characteristics of a rechargeable lithium battery.

The inorganic compound having a plate shape may have an aspect ratio (a long axis to thickness ratio) of about 1:5 to about 1:100. For example, the aspect ratio may be in a range of about 1:10 to about 1:100, about 1:5 to 1:50, or about 1:10 to about 1:50.

The inorganic compound may have a length ratio of a long axis relative to a short axis of about 1 to about 3. In one embodiment, the length ratio may be in a range of about 1 to about 2, and for example, is about (closer to) 1.

The aspect ratio and the length ratio of a long axis relative to a short axis may be measured through a scanning electron microscope (SEM) photograph. When the inorganic compound has an aspect ratio within the range or the length ratio of a long axis relative to a short axis within the range, a separator may be further suppressed from its area shrinkage at high temperatures, have a relatively high porosity, and improved penetration characteristics of a rechargeable lithium battery.

When the inorganic compound has a plate shape, the flat face of the inorganic compound relative to one side (surface) of the porous substrate has an average angle of about 0° to about 30°. In one embodiment, the angle is closer to 0°. That is, the flat face of the inorganic compound is parallel to one side of the porous substrate. When the flat face of the inorganic compound relative to one side of the porous substrate has an average angle within the range, thermal shrinkage of the porous substrate may be effectively reduced or prevented, providing a separator having a low thermal shrinkage ratio.

The organic compound may be a cross-linked polymer. The organic compound may be a highly cross-linked polymer which does not show a glass transition temperature ($T_g$). When the highly cross-linked polymer is used, a shrinkage ratio of a porous substrate at a high temperature may be effectively suppressed by improving the heat resistance.

The organic compound may include an acrylate-based compound or a derivative thereof, a diallyl phthalate-based compound or a derivative thereof, a polyimide-based compound or a derivative thereof, a polyurethane-based compound or a derivative thereof, a copolymer thereof, or a combination thereof.

For example, the organic compound as the filler may be cross-linked polystyrene, or cross-linked polymethyl methacrylate.

The filler may have a structure where primary particles are aggregated to form a secondary particle. When such a filler is used, porosity of a coating layer is increased, and a rechargeable lithium battery having suitable (e.g., excellent) high power characteristics may be provided.

(B) Binder

The binder (B) includes the inorganic particle, the organic particle or a combination thereof, and the organic polymer. The binder may be a mixture of the inorganic particle, the organic particle, or a combination thereof, and the organic polymer.

First, the organic polymer is described.

In the binder (B), the organic polymer may be included, for example, in a form of emulsion, suspension or colloid, and may be, for example, a diene-based polymer, an acrylate-based polymer, a styrene-based polymer, a urethane-based polymer, a polyolefin-based polymer, or a combination thereof.

The organic polymer may be, for example, a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, an ethylene propylene copolymer, polyethyleneoxide, polyvinylpyrrolidone, polyepichlorohydrine, polyphosphazene, polyacrylate, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, carboxylmethyl cellulose, hydroxypropylmethyl cellulose, hydroxypropyl cellulose, diacetyl cellulose, or a combination thereof.

The organic polymer may be obtained by a suitable method of emulsion polymerization, solution polymerization, or the like using a polymerizable monomer. During polymerization, a polymerization temperature, a polymerization pressure, a method of adding the polymerizable monomer and the like, an additive (e.g., a polymerization initiator, a molecular weight adjusting agent, and/or a pH adjusting agent), or the like, are not particularly limited.

The polymerizable monomer for the organic polymer may be, for example, ethylenic unsaturated carboxylic acid alkyl ester such as methyl(meth)acrylate, butyl(meth)acrylate, ethyl(meth)acrylate, or 2-ethyl hexyl(meth)acrylate; a cyano group-containing ethylenic unsaturated monomer such as acrylonitrile, metacrylonitrile, fumaronitrile, α-chloro acrylonitrile, or α-cyanoethylacrylonitrile; a conjugated diene monomer such as 1,3-butadiene, isoprene, 2,3-dimethyl-1,3-butadiene, 2-ethyl-1,3-butadiene, 1,3-pentadiene, or chloroprene; ethylenic unsaturated carboxylic acid or a salt thereof, such as acrylic acid, methacrylic acid, maleic acid, fumaric acid, or citraconic acid; an aromatic vinyl monomer such as styrene, alkyl styrene, or vinyl naphthalene; fluoro alkyl vinyl ether such as fluoro ethyl vinyl ether; a non-conjugation diene monomer such as vinyl pyridine; vinylnorbornene, dicyclopentadiene, or 1,4-hexadiene; α-olefin such as ethylene, or propylene; an ethylenic unsaturated amide monomer such as (meth)acryl amide; a sulfonic acid-based unsaturated monomer such as acryl amide methyl propane sulfonic acid, or styrene sulfonic acid; or the like.

In addition, the polymerizable monomer having a cross-linking functional group may be included in an amount of less than or equal to about 5 wt % and for example, less than or equal to about 2 wt %, based on the total amount of polymerizable monomers used to obtain the organic polymer.

The cross-linking functional group may become a cross-linking point when the organic polymer is cross-linked and include, for example, a hydroxyl group, a glycidyl group, an amino group, an N-methylol group, a vinyl group, or the like. Examples of the polymerizable monomer having the cross-linking functional group may be hydroxyl ester of ethylenic unsaturated carboxylic acid such as hydroxy propyl(meth)acrylate, or hydroxy ethyl(meth)acrylate; ethylenic unsaturated carboxylic acid glycidyl ester such as glycidyl(meth)acrylate; ethylenic unsaturated carboxylic acid amino ester such as dimethyl amino ethyl(meth)acrylate; a methylol group-containing ethylenic unsaturated amide such as N-methylol(meth)acryl amide, or N,N-dimethylol(meth)acryl amide; and a monomer having two or more vinyl groups such as ethylene di(meth)acrylate, or divinyl benzene.

The cross-linking functional group reacts with an organic binding functional group of the post-described binding agent and may form a chemical bond therewith. This will be explained in more detail when the following binding agent is illustrated.

During preparation of the organic polymer, for example, the polymerization initiator may be a water-soluble initiator such as persulfate, an oil-soluble initiator such as benzoyl peroxide, or the like. For example, the molecular weight adjusting agent may be mercaptans such as t-dodecyl mercaptan, or n-dodecyl mercaptan; α-methylstyrene dimers; sulfides such as dimethyl xanthene disulfide, or diisopropyl xanthene disulfide; nitrile compounds such as 2-methyl-3-butene nitrile, or 3-pentene nitrile; or the like, which may be used singularly or in a mixture of two or more. For example, the emulsifier may be an anionic surfactant, a non-ionic surfactant, or the like and may be used singularly or in a combination. In addition, a reactive surfactant, a protective colloid, or the like may also be used.

The organic polymer may have, for example, a glass transition temperature (Tg) of about −50° C. to about 60° C., or about −40° C. to about 20° C.

The organic polymer may have a particle diameter of about 0.05 μm to about 0.5 μm, and for example, about 0.08 μm to about 0.2 μm. When the organic polymer has a particle size within the range, an appropriate viscosity may be obtained, and safety of a rechargeable lithium battery including a separator having a coating layer formed thereof may be improved.

In addition, the organic polymer may have a pH in a range of about 7 to about 10.5 to maintain the stability. The pH may be controlled by using a pH adjusting agent. The pH adjusting agent may be, for example, ammonia, an alkali metal hydroxide (e.g., lithium hydroxide, sodium hydroxide, potassium hydroxide), or the like.

The organic polymer may be obtained by a suitable emulsion polymerization method or a phase inversion method. The emulsion polymerization method and the phase inversion method have no particular limited conditions.

Hereinafter, the inorganic particle, the organic particle, or a combination thereof is described.

The inorganic particle, the organic particle, or a combination thereof may be uniformly dispersed within a coating layer.

The inorganic particle, the organic particle, or a combination thereof is used as a mixture with the organic polymer and thus, may provide the separator with an appropriate strength and heat resistance and improve the safety of a rechargeable lithium battery including the separator.

The inorganic particle, the organic particle or a combination thereof may have an average particle diameter of about 5 nm to about 200 nm. For example, the average particle diameter may be in a range of about 5 nm to about 150 nm, about 5 nm to about 100 nm, about 10 nm to about 100 nm, or about 5 nm to about 50 nm. An inorganic compound having an average particle diameter within the range may provide the separator coating layer with an appropriate strength.

The inorganic particle, the organic particle or a combination thereof may be included in an amount of about 10 parts by weight to about 100 parts by weight based on 100 parts by weight of the organic polymer. For example, the inorganic particle, the organic particle or a combination thereof may be included in an amount of about 20 parts by weight to about 80 parts by weight, or about 20 parts by weight to about 60 parts by weight. When the inorganic particle, the organic particle or a combination thereof is included within the range, an appropriate strength and simultaneously, a sufficient adherence may be realized.

The inorganic particle may be the same as or different from the inorganic compound included in the filler (A). For example, the inorganic particle may be selected from a metal oxide, a metal hydroxide, a semi-metal oxide, or a metal fluoride. The inorganic particle may include $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or a combination thereof, but is not limited thereto. In one embodiment, the inorganic particle may be colloid silica, alumina particulate, or the like, but is not limited thereto.

The inorganic compound may have, for example, an amorphous phase.

In addition, the inorganic particle may have a hydrophilic group such as a hydroxyl group or the like on the surface. The inorganic compound having the hydrophilic group on the surface may have higher reactivity with the organic polymer or a binding agent.

On the other hand, when the binder includes the inorganic particle and the organic polymer, the binder may further include a binding agent that binds the inorganic particle and the organic polymer.

The binding agent may form a covalent bond with a functional group present in the inorganic particle and/or the organic polymer and play a role of more firmly binding the inorganic particle with the organic polymer.

In other words, the organic polymer and the inorganic particle in the binder are organically linked through the binding agent. As a result, the coating layer may have a suitable (e.g., an excellent) heat resistance even when the inorganic particle is included in a small amount, the organic polymer exposed to the surface of the coating layer may have an increased surface area, and adherence of the coating layer to an electrode plate may be improved.

The binding agent may be present in the coating layer as a material resulted from a reaction (a reaction product) with the inorganic particle and/or the organic polymer.

The binding agent may include a functional group having reactivity with a polar functional group. For example, the binding agent may include a functional group having reactivity with a carboxyl group, a functional group having reactivity with a hydroxyl group, a functional group having reactivity with an amine group, a functional group having reactivity with water, or a combination thereof.

For example, the binding agent may be a carbodiimide-based compound. For example, it may be N,N'-di-o-tolylcarbodiimide, N,N'-diphenylcarbodiimide, N,N'-dioctyldecylcarbodiimide, N,N'-di-2,6-diphenylphenylcarbodiimide, N-tolyl-N'cyclohexylcarbodiimide, N,N'-di-2,6-diisopropylphenylcarbodiimide, N,N'-di-2,6-di-tertiary-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, p-phenylene-bis-di-o-tolylcarbodiimide, p-phenylene-bisdicyclohexylcarbodiimide, hexamethylene-bisdicyclohexylcarbodiimide, ethylene-bisdiphenylcarbodlimide, a benzene-2,4-diisocyanatho-1,3,5-tris(1-methylethyl) homopolymer, a copolymer of 2,4-diisocyanatho-1,3,5-tris (1-methylethyl) and 2,6-diisopropyl diisocyanate, or a combination thereof, but is not limited thereto. Here, any suitable carbodiimide-based compound may be used.

In the binder, the carbodiimide-based compound may be present as a reaction resulting material (a reaction product) with the inorganic particle and/or the organic polymer. For example, the diimide bond of the carbodiimide-based compound reacts with a polar functional group on the surface of the inorganic particle and forms a new covalent bond.

For example, the binding agent may be a silane coupling agent. The silane coupling agent is an organosilicon compound having a hydrolytic functional group. The hydrolytic functional group is a functional group that may bind with an inorganic particle such as silica or the like after hydrolysis. For example, the silane coupling agent may include at least one functional group selected from an alkoxy group, a halogen atom, an amino group, a vinyl group, a glycidoxy group, or a hydroxyl group.

The silane coupling agent may, in one embodiment, include at least one compound selected from vinylalkylalkoxysilane epoxyalkylalkoxysilane, mercaptoalkylalkoxysilane, vinylhalosilane, or alkylacyloxysilan.

Examples of the silane coupling agent may be vinylalkylalkoxysilane such as vinyltris(β-methoxyethoxy)silane, or γ-methacryloxypropyltrimethoxysilane; epoxyalkylalkoxysilane such as γ-glycidoxypropyl trimethoxysilane, β-(3,4-epoxycyclohexyl)ethyl trimethoxysilane, or γ-glycidoxypropyl methyldiethoxysilane; aminoalkyl alkoxysilane such as γ-aminopropyl triethoxysilane; mercaptoalkyl alkoxysilane such as γ-mercaptopropyltrimethoxysilane; halogenated alkyl alkoxysilane such as γ-chloropropyl trimethoxysilane; vinyl halosilane such as vinyl trichlorosilane; alkylacyloxysilane such as methyltriacetoxysilane; and the like, but are not limited thereto. Here, any suitable silane coupling agent may be used.

The binding agent may also include an organic binding functional group. The organic binding functional group has reactivity with a cross-linking functional group included in the above described organic polymer.

The above hydrolytic group of the binding agent partly may function as an organic binding functional group. Alternatively, the binding agent prepared by introducing the organic binding functional group into an organosilicon compound having the above hydrolytic group may be used. The binding agent may be bonded with the organic polymer through the organic binding functional group.

The binding agent may include a hydrazine compound, an isocyanate compound, a melamine compound, a urea compound, an epoxy compound, a carbodiimide compound, an oxazoline compound, or the like other than the organic polymer. For example, the oxazoline compound, the carbodiimide compound, the epoxy compound, and/or the isocyanate compound may be used. The binding agent is not limited thereto but may include any suitable binding agent used in a related art. Such a compound may be used singularly or in a mixture.

The other binding agents may have self cross-linking properties, polyvalent coordination properties, or the like.

In addition, a commercially-available binding agent may be used.

For example, the hydrazine compound may include APA series (APA-M950, APA-M980, APA-P250, and/or APA-P280 manufactured by Otsuka Chemical Co.), or the like.

The isocyanate compound may include BASONAT PLR8878 and/or BASONAT HW-100 manufactured by BASF Corp., Bayhydur 3100 and/or Bayhydur VPLS2150/1 manufactured by Sumitomo Bayer Urethane Co., Ltd., or the like.

The melamine compound may include SAIMEL 325 manufactured by Mitsui Cytec Ltd., or the like.

The urea compound may include Bekamin series manufactured by DIC, or the like.

The epoxy compound may include Denacol series (EM-150, EM-101) manufactured by Nagase ChemteX Corp., ADEKA RESIN EM-00517, EM-0526, EM-051R, EM-11-50B manufactured by Adeka Corporation, or the like.

The carbodiimide compound may include Carbodilite series (SV-02, V-02, V-02-L2, V-04, E-01, E-02, V-01, V-03, V-07, V-09, V-05 made by Nisshinbo Chemical Inc.), or the like.

The oxazoline compound may include Epocros series (WS-500, WS-700, K-1010E, K-1020E, K-1030E, K-2010E, K-2020E, K-2030E) manufactured by Nippon Shokubai Co., Ltd., or the like.

These compounds may be commercially available as a dispersion or a solution including a binding agent.

The binding agent may be included in an amount of about 0.03 parts by weight to about 10 parts by weight based on 100 parts by weight of the organic polymer. For example, it may be included in an amount of about 0.03 parts by weight to about 5 parts by weight, about 0.03 parts by weight to about 1 part by weight, about 0.1 parts by weight to about 10 parts by weight, about 0.1 parts by weight to about 5 parts by weight, or about 0.1 parts by weight to about 1 part by weight based on 100 parts by weight of the organic polymer.

When the binding agent is used within the amount range, the binding agent may sufficiently bind the organic polymer and the inorganic particle, and thus, a rechargeable lithium battery including the same may have (secure) sufficient heat resistance. In addition, when the binding agent is used within the amount range, a non-reacted binding agent is not left in a large amount and may reduce or prevent characteristic deterioration of a rechargeable lithium battery.

The organic particle may be the same as or different from the organic compound included in the filler (A).

For example, the organic particle may be an acrylate-based compound or a derivative thereof, a diallyl phthalate-based compound or a derivative thereof, a polyimide-based compound or a derivative thereof, a urethane-based compound or a derivative thereof, a copolymer thereof, or a combination thereof.

For example, the organic particle may be a cross-linked polymer.

The organic particle may have a glass transition temperature ($T_g$) of greater than or equal to about 60° C. For example, the organic particle may have a glass transition temperature of about 60° C. to about 600° C., about 60° C. to about 500° C., or about 60° C. to about 400° C.

Examples of the organic particle having a glass transition temperature of greater than or equal to about 60° C. may be polyurethane.

In addition, the organic particle may introduce a functional group such as a carboxyl group, a hydroxyl group, an epoxy group, or the like in order to increase reactivity with the organic polymer.

The inorganic particle, the organic particle, or a combination thereof may be used in a colloid state. The particles in a colloid state may be acidic, neutral, or alkaline. For example, the particles in a colloid state may be alkaline having a pH of about 8.5 to about 10.5. The particles in a colloid solution having a pH within the range may be reduced or prevented from cohesion and gelation and maintain storage stability.

Here, the binder is obtained by mixing the inorganic particle, the organic particle, or a combination thereof with the organic polymer and may have increased heat resistance when the organic polymer is cross-linked and for example, may have a storage modulus (elasticity) at 100° C. in a range of about 30 MPa to about 150 MPa. When the storage modulus at 100° C. is within the range, a separator including the binder may sufficiently suppress a shrinkage ratio and realize a suitable (e.g., excellent) heat resistance.

In addition, the binder may have a storage modulus (elasticity) at 40° C. in a range of about 50 MPa to about 200 MPa. When the binder has too high elasticity (higher than 200 MPa) at room temperature, a separator including the same may be cracked, and shortcomings related to coating layer separation during coating layer formation may happen. When the binder has storage modulus at about 40° C. within the range, this problem may be reduced or prevented.

The coating layer may be formed by mixing the filler (A) and the binder (B) to prepare a composition for a coating layer and coating the composition on a porous substrate.

The coating layer may be formed on one side or both sides of the porous substrate. A thickness of the coating layer may be about 0 μm to about 5 μm, about 0.5 μm to about 5 μm, or about 1 μm to about 5 μm on each side. When the coating layer has a thickness within the range, a rechargeable lithium battery including the same may be reduced or prevented from capacity deterioration as well as sufficiently secure heat resistance.

The porous substrate may be a glass fiber, polyester, TEFLON® (tetrafluoroethylene), polyolefin, polytetrafluoroethylene (PTFE), polyacrylonitrile, or a combination thereof. For example, the porous substrate includes polyolefin such as polyethylene, polypropylene, or the like, and a multilayer of two or more layers may be used. Examples of the multilayer porous substrate may include a mixed multilayer such as a polyethylene/polypropylene double-layered separator, a polyethylene/polypropylene/polyethylene triple-layered separator, a polypropylene/polyethylene/polypropylene triple-layered separator, or the like.

As described above, the separator may additionally include an adhesion layer on the coating layer.

The adhesion layer may improve adhesion of an electrode to the separator. In other words, the adhesion layer may more stably adhere an electrode to a separator and thus, reduce or prevent generation of a gap due to detachment of the separator from the electrode, and fix the separator in a pouch-type battery using a soft wrapping material such as a laminate film, or the like.

The adhesion layer may include, for example, a binder (B) including an inorganic particle, an organic particle, or a combination thereof, and an organic polymer; an acrylate-based binder; a rubber-based binder; a diene-based binder; a styrene-based binder; or a combination thereof.

That is, the adhesion layer may include the above binder (B), or a commercially available binder.

The binder (B) including the inorganic particle, the organic particle, or a combination thereof, and the organic polymer in the adhesion layer is the same as described above.

The acrylate-based binder refers to an acrylate-based polymer or copolymer, and may be, for example, poly(meth)acrylate, poly alkyl(meth)acrylate, polyacrylonitrile, or a combination thereof.

The rubber-based binder may include, for example, a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, or a combination thereof.

The diene-based binder is a binder obtained by polymerization or copolymerization of a diene-based monomer, and the diene-based monomer may be butadiene, isoprene, or the like. Examples of the polymer obtained by polymerization of the diene-based monomer may be a butadiene rubber, an acrylic rubber, a styrene/butadiene rubber, an acrylonitrile/butadiene rubber, an isoprene rubber, an ethylene-propylene-diene terpolymer, or the like.

The styrene-based binder may be obtained by polymerization of about 20 wt % to about 100 wt % of a styrene-based monomer; and about 0 wt % to about 80 wt % of a vinyl-based monomer. The vinyl-based monomer may be an acrylate-based monomer, a hetero cyclic monomer, an unsaturated nitrile monomer, or a combination thereof. The styrene-based monomer may be styrene, a C1 to C10 alkyl substituted styrene, a halogen substituted styrene, or a combination thereof.

In another embodiment, provided is a separator that includes a porous substrate, a coating layer positioned on one side or both sides of the porous substrate and an adhesion layer positioned on the coating layer, wherein the coating layer includes a filler (A) having an average particle diameter of about 0.3 μm to about 2 μm and a binder resin, and the adhesion layer includes a binder (B) including an inorganic particle, an organic particle, or a combination thereof, and an organic polymer, wherein each average particle diameter of the inorganic particle and the organic particle is about 5 nm to about 200 nm.

The coating layer includes a general binder resin, and the adhesion layer includes a binder (B) including the inorganic particle, the organic particle, or a combination thereof and the organic polymer. The separator has a small amount of remaining moisture, a low shrinkage ratio at a high temperature, and a suitable (e.g., excellent) heat resistance.

Explanations of the filler (A) and the binder (B) are the same as above and will not be repeated.

The binder resin included in the coating layer may include any commonly-used binder resin without a particular limit. For example, the binder resin may include an acrylate-based resin, a rubber-based resin, a diene-based resin, a styrene-based resin, or a combination thereof.

The acrylate-based resin may be an acrylate-based polymer or copolymer, and may be, for example, poly(meth)acrylate, poly alkyl(meth)acrylate, polyacrylonitrile, or a combination thereof.

The rubber-based resin may be, for example, a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, or a combination thereof.

The diene-based resin is a resin obtained by polymerization or copolymerization of a diene-based monomer, and the diene-based monomer may be butadiene, isoprene, or the like. Examples of the polymer obtained by polymerization of the diene-based monomer may be a butadiene rubber, an acrylic rubber, a styrene/butadiene rubber, an acrylonitrile/butadiene rubber, an isoprene rubber, an ethylene-propylene-diene terpolymer, and the like.

The styrene-based resin may be obtained by polymerization of about 20 wt % to about 100 wt % of a styrene-based monomer; and about 0 to about 80 wt % of a vinyl-based monomer. The vinyl-based monomer may be an acrylate-based monomer, a hetero cyclic monomer, an unsaturated nitrile monomer, or a combination thereof.

In another embodiment, provided is a rechargeable lithium battery including a positive electrode including a positive active material; a negative electrode including a negative active material; a non-aqueous electrolyte; and the above separator positioned between the positive electrode and the negative electrode.

A rechargeable lithium battery may be classified into a lithium ion battery, a lithium ion physical polymer battery and a lithium ion chemical gel polymer battery depending on kinds of a separator and an electrolyte. It also may be classified to be cylindrical, prismatic, coin-type, pouch-type, and the like depending on its shape. In addition, it may be a bulk type or a thin film type depending on a size. Structures and manufacturing methods for lithium ion batteries pertaining to this disclosure are known in the art.

The drawing is an exploded perspective view showing a rechargeable lithium battery according to one embodiment. Referring to the drawing, the rechargeable lithium battery 100 is a cylindrical battery including a negative electrode 112, a positive electrode 114 and a separator 113 disposed between the negative electrode 112 and the positive electrode 114, an electrolyte impregnated in the negative electrode 112, the positive electrode 114, and the separator 113, a battery case 120, and a sealing member 140 sealing the battery case 120. The rechargeable lithium battery 100 is manufactured by sequentially laminating a negative electrode 112, a separator 113, and a positive electrode 114, spirally winding them, and housing the spiral-wound product in a battery case 120.

The separator 113 may include any materials commonly used in the conventional lithium battery as long as it is suitable for separating a negative electrode 112 from a positive electrode 114 and providing a transporting passage for lithium ions. The entire thickness of a separator may be determined depending on a desirable battery capacity. For example, a thickness of the separator may be about 5 µm to about 30 µm.

The negative electrode 112 may include a current collector and a negative active material layer formed on the current collector, and the negative active material layer includes a negative active material.

The negative active material includes a material that can reversibly intercalate/deintercalate lithium ions, such as a lithium metal, a lithium metal alloy, a material capable of doping and dedoping lithium, or a transition metal oxide.

The material that can reversibly intercalate/deintercalate lithium ions may be a carbon material. The carbon material may be any generally-used carbon-based negative active material in a lithium ion rechargeable battery. Examples of the carbon material include crystalline carbon, amorphous carbon, and mixtures thereof. The crystalline carbon may be irregular-shaped, or sheet, flake, spherical, or fiber-shaped natural graphite or artificial graphite. The amorphous carbon may be a soft carbon, a hard carbon, a mesophase pitch carbonized product, fired coke, or the like.

The lithium metal alloy may include lithium and a metal of Na, K, Rb, Cs, Fr, Be, Mg, Ca, Sr, Si, Sb, Pb, In, Zn, Ba, Ra, Ge, Al, or Sn.

The material capable of doping and dedoping lithium may include Si, $SiO_x$ ($0<x<2$), a Si—C composite, a Si-Q alloy (wherein the Q is an alkali metal, an alkaline-earth metal, a Group 13 to 16 elements other than Si, a transition metal, a rare earth element, or a combination thereof), Sn, $SnO_2$, a Sn—C composite, a Sn—R alloy (wherein R is an alkali metal, an alkaline-earth metal, a Group 13 to 16 elements other than Sn, a transition metal, a rare earth element, or a combination thereof). The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof.

The transition metal oxide may include vanadium oxide, lithium vanadium oxide, or the like.

The negative active material layer includes a binder, and optionally a conductive material.

The binder improves the binding properties of the negative active material particles with one another and with a current collector. The binder may include a non-water-soluble binder, a water-soluble binder, or a combination thereof.

Nonlimiting examples of the non-water-soluble binder include polyvinylchloride, carboxylated polyvinylchloride, polyvinyl fluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinyl alcohol, sodium polyacrylate, copolymers of propylene and a C2 to C8 olefin, copolymers of (meth) acrylic acid and (meth)acrylic acid alkyl ester, and combinations thereof.

When a water-soluble binder is used as the negative electrode binder, a cellulose-based compound may also be included to provide viscosity. The cellulose-based compound may include one or more of carboxymethyl cellulose, hydroxypropylmethyl cellulose, methyl cellulose, and alkali metal salts thereof. The alkali metal may be Na, K, or Li. The cellulose-based compound may be included in an amount of about 0.1 to about 3 parts by weight based on 100 parts by weight of the negative active material.

The conductive material improves the electrical conductivity of an electrode. Any suitable electrically conductive material may be used as a conductive material, unless it causes a chemical change. Examples thereof may be a carbon-based material such as natural graphite, artificial graphite, carbon black, acetylene black, ketjen black, or a carbon fiber; a metal-based material such as a metal powder or a metal fiber of copper, nickel, aluminum, silver, or the like; a conductive polymer such as a polyphenylene derivative; or a mixture thereof.

The current collector may be a copper foil, a nickel foil, a stainless steel foil, a titanium foil, a nickel foam, a copper foam, a polymer substrate coated with a conductive metal, or a combination thereof.

The positive electrode 114 may include a current collector and a positive active material layer formed on the current collector.

The positive active material may include lithiated intercalation compounds that reversibly intercalate and deintercalate lithium ions. For example, a composite oxide of lithium and at least one of cobalt, manganese, nickel, or a combination thereof may be used, and examples may be compounds represented by the following formulae:

$Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $Li_aE_{2-b}R_bO_{4-c}D_c$ (0.90≤a≤1.8, 0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c 0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dG_eO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on the properties of a positive active material by using these elements in the compound. For example, the method may include any coating method such as spray coating, dipping, or the like, but is not illustrated in more detail since it is known to those who work in the related field.

The positive active material layer may include a binder and a conductive material.

The binder improves the binding properties of the positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves the conductivity of an electrode. Any suitable electrically conductive material may be used as a conductive material, unless it causes a chemical change. Examples thereof may be one or more natural graphite, artificial graphite, carbon black, acetylene black, ketjen black, a carbon fiber, copper, nickel, aluminum, silver, a metal powder, a metal fiber, a conductive polymer such as a polyphenylene derivative, and the like.

The current collector may be Al but is not limited thereto.

The negative electrode and the positive electrode may be manufactured by a method including mixing each active material, a conductive material and a binder in a solvent to prepare an active material composition, and coating the composition on a current collector. The solvent may be N-methyl pyrrolidone or water. The electrode manufacturing method is known, and thus is not described in more detail in the present specification.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, and the ester based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like, and the ketone-based solvent may include cyclohexanone, or the like. The alcohol-based solvent may include ethanol, isopropyl alcohol, or the like, and the aprotic solvent may include nitriles such as R—CN (wherein, R is a C2 to C20 linear, branched or cyclic hydrocarbon group, and may include a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance.

The carbonate-based solvent may be prepared by mixing a cyclic carbonate and a linear carbonate. The cyclic carbonate and the linear carbonate are mixed together in the volume ratio of about 1:1 to about 1:9. Within this range, performance of electrolyte may be improved.

The non-aqueous organic solvent may further include an aromatic hydrocarbon-based organic solvent as well as the carbonate based solvent. The carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound represented by the following Chemical Formula 1.

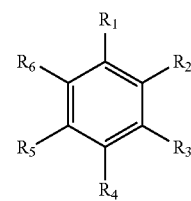

Chemical Formula 1

In the above Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 2 in order to improve cycle-life of a battery

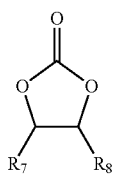

Chemical Formula 2

In the above Chemical Formula 2, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group(CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in an organic solvent, supplies lithium ions in a battery, operates a basic operation of the rechargeable lithium battery, and improves lithium ion transportation between positive and negative electrodes therein. Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato) borate; LiBOB), or a combination thereof, which is used as a supporting electrolytic salt. The lithium salt may be used at a 0.1 M to 2.0 M concentration. When the lithium salt is included at the above concentration range, an electrolyte may have suitable (e.g., excellent) performance and lithium ion mobility due to improved or optimal electrolyte conductivity and viscosity.

EXAMPLE

Hereinafter, examples of the present invention and comparative examples are described. These examples, however, are not in any sense to be interpreted as limiting the scope of the invention.

Manufacture of Separator

Example 1

A binder composition was prepared by adding 20 dry parts by weight of colloid silica (a solid of 20 wt %, an average particle diameter of 50 nm, Snotex 0, Nissan Chemical Industries, Ltd.) as an inorganic particle to 100 dry parts by weight of a diene-based binder ($T_g$ of 5° C., a gel amount of 90%, BM451 B, Japan Zeon Corp.) and agitating the mixture and then, adding 2 parts by weight of γ-glycidoxy propyltrimethoxysilane as a binding agent. The storage modulus at 40° C. binder composition was 80 MPa.

6 parts by weight of the binder composition, 100 parts by weight of alumina (average particle diameter of 0.5 μm, Sigma-Aldrich Co., Ltd.) as a filler, and 0.5 parts by weight of a dispersing agent (Aron T-40, Toa Synthetic Chemical Co., Ltd.) were mixed and agitated, obtaining a composition for a coating layer.

The composition for a coating layer was gravure-printed on both sides of a 16 μm-thick polyethylene separator to manufacture a separator. The coating layer was 3 μm thick on each side. The amount of the filler was 92 wt % based on the total amount of the coating layer.

Example 2

A separator was manufactured according to the same method as Example 1 except for using 30 dry parts by weight of inorganic particle colloid silica. The storage modulus at 40° C. binder composition was 120 MPa, and the amount of the filler was 92 wt % based on the total amount of the coating layer.

Example 3

A separator was manufactured according to the same method as Example 1 except for using 40 dry parts by weight of inorganic particle colloid silica. The storage modulus at 40° C. binder composition was 70 MPa and the amount of the filler was 92 wt % based on the total amount of the coating layer.

Example 4

A binder composition was prepared by adding 20 dry parts by weight of polymethyl methacrylate cross-linked with an organic particle (PMMA, a particle diameter of 38 nm, a solid concentration of 10%, EPOSTAR2B20 made by Nippon Shokubai Co., Ltd.) to 100 dry parts by weight of a diene-based binder ($T_g$ of 5° C., a gel amount of 90%, BM451 B made by Japan Zeon Corp.) as an organic polymer and agitating the mixture and then, adding 1 part by weight of carbodilite V02L2 made by Nisshinbo Chemical Inc. as a binding agent thereto and agitating the mixture. The storage modulus at 40° C. binder composition was 100 MPa.

Hereinafter, a separator was manufactured according to the same method as Example 1. The amount of the filler was 92 wt % based on the total amount of the coating layer.

Example 5

A separator was manufactured according to the same method as Example 4 except for using 30 dry parts by weight of an organic particle. The storage modulus at 40° C. binder composition was 120 MPa and the amount of the filler was 92 wt % based on the total amount of the coating layer.

Example 6

A separator was manufactured according to the same method as Example 4 except for using 40 dry parts by weight of an organic particle. The storage modulus at 40° C. binder composition was 90 MPa.

Comparative Example 1

A separator was manufactured according to the same method as Example 1 except for using a diene-based binder ($T_g$ of 5° C., a gel amount of 90%, BM451 B manufactured by Japan Zeon Corp.) as a binder composition.

Comparative Example 2

A separator was manufactured according to the same method as Example 1 except for using only a diene-based binder ($T_g$ of 5° C., a gel amount of 90%, BM451 B manufactured by Japan Zeon Corp.) but no filler as a binder composition.

In other words, the separator was manufactured by gravure-printing only a diene-based binder ($T_g$ of 5° C., a gel amount of 90%, BM451 B manufactured by Japan Zeon Corp.) on both sides of a polyethylene separator substrate.

Manufacture of Rechargeable Lithium Battery Cell

Examples 7 to 12 and Comparative Examples 3 and 4

Positive Electrode

Positive active material slurry was prepared by mixing $LiCoO_2$ as a positive active material, polyvinylidene fluoride (PVDF) as a binder, and carbon black as a conductive agent in a weight ratio of 92:4:4 and dispersing the mixture into N-methyl-2-pyrrolidone. This slurry was coated to be 20 μm thick on an aluminum foil and then, dried and compressed, to manufacture a positive electrode.

Negative Electrode

Negative active material slurry was prepared by mixing artificial graphite as a negative active material, a styrene-butadiene rubber as a binder, and carboxylmethyl cellulose as a thickener in a weight ratio of 96:2:2 and dispersing the mixture into water. This slurry was coated on a 15 μm-thick copper foil and then, dried and compressed to manufacture a negative electrode.

Manufacture of Battery Cell

The positive and negative electrodes and each separator according to Examples 1 to 6 and Comparative Examples 1 and 2 were used to manufacture a pouch-type battery cell. Herein, an electrolyte solution was prepared by mixing ethylene carbonate (EC)/ethylmethyl carbonate (EMC)/diethyl carbonate (DEC) in a volume ratio of 3/5/2 and including 1.3 M concentration of $LiPF_6$ therein.

Evaluation Example

High Temperature Shrinkage Ratio of Separator

The separators according to Examples 1 to 6 and Comparative Examples 1 to 2 were respectively heat-treated in a convection oven at 130° C. and 150° C. for 10 minutes and then, taken out therefrom and cooled down to room temperature, and the shrinkage ratios of the separators were measured. The results are provided in the following Table 1.

TABLE 1

| | Shrinkage ratio (%) | |
| --- | --- | --- |
| | 130° C. | 150° C. |
| Example 1 | 2 | 17 |
| Example 2 | 1.8 | 13 |
| Example 3 | 1.5 | 9 |
| Example 4 | 2.3 | 21 |
| Example 5 | 2.1 | 15 |
| Example 6 | 1.8 | 11 |
| Comparative Example 1 | 6 | 60 |
| Comparative Example 2 | 5 | 42 |

As shown in Table 1, the separators according to Examples 1 to 6 showed remarkably improved shrinkage ratios compared with the separators according to Comparative Examples 1 and 2.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof. Therefore, the above embodiments should be understood to be examples but not limiting the present invention in any way.

What is claimed is:

1. A separator comprising:
a porous substrate, and
a coating layer on one side or both sides of the porous substrate,
wherein the coating layer comprises:
a filler (A) having an average particle diameter of about 0.3 μm to about 2 μm; and
a binder (B) comprising: an organic polymer having a glass transition temperature ($T_g$) of about −50° C. to about 60° C.; and an inorganic particle having an average particle diameter of about 5 nm to about 200 nm, an organic particle having an average particle diameter of about 5 nm to about 200 nm, or a combination thereof,
wherein, in the binder (B), the inorganic particle, the organic particle or the combination thereof is included in an amount of about 10 parts by weight to about 100 parts by weight based on 100 parts by weight of the organic polymer.

2. The separator of claim 1, wherein the separator further comprises an adhesion layer on the coating layer.

3. The separator of claim 2, wherein the adhesion layer comprises: the binder (B); an acrylate-based binder; a rubber-based binder; a diene-based binder; a styrene-based binder; or a combination thereof.

4. The separator of claim 1, wherein the organic polymer comprises a diene-based polymer, an acrylate-based polymer, a styrene-based polymer, a urethane-based polymer, a polyolefin-based polymer, or a combination thereof.

5. The separator of claim 1, wherein the binder (B) comprises the organic particle comprising a cross-linked polymer.

6. The separator of claim 5, wherein the organic particle comprises cross-linked polymethyl methacrylate (PMMA).

7. The separator of claim 1, wherein the binder (B) comprises the organic particle having a glass transition temperature of greater than or equal to about 60 °C.

8. The separator of claim 7, wherein the organic particle comprises polyurethane.

9. The separator of claim 1, wherein the binder (B) comprises the inorganic particle comprising $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or a combination thereof.

10. The separator of claim 1, wherein the binder (B) comprises an inorganic particle and an organic polymer, and
the binder (B) further comprises a binding agent to bind the inorganic particle and the organic polymer.

11. The separator of claim 10, wherein the binding agent is included in an amount of about 0.03 parts by weight to about 10 parts by weight based on 100 parts by weight of the organic polymer.

12. The separator of claim 1, wherein the binder (B) has a storage modulus at 40° C. of about 50 MPa to about 200 MPa, and a storage modulus at 100° C. of about 30 MPa to about 150 MPa.

13. The separator of claim 1, wherein the filler (A) is included in an amount of about 70 wt % to about 99 wt % based on a total amount of the coating layer.

14. The separator of claim 1, wherein the filler (A) is an inorganic compound, an organic compound, or a combination thereof.

15. A separator comprising:
a porous substrate;
a coating layer on one side or both sides of the porous substrate; and
an adhesion layer on the coating layer,
wherein the coating layer comprises:
a filler (A) having an average particle diameter of about 0.3 μm to about 2 μm; and
a binder resin, and
a binder (B) comprising: an organic polymer having a glass transition temperature ($T_g$) of about −50° C. to about 60° C; and an inorganic particle having an average particle diameter of about 5 nm to about 200 nm, an organic particle having an average particle diameter of about 5 nm to about 200 nm, or a combination thereof,
wherein, in the binder (B), the inorganic particle, the organic particle or the combination thereof is included in an amount of about 10 parts by weight to about 100 parts by weight based on 100 parts by weight of the organic polymer.

16. A rechargeable lithium battery comprising the separator of claim 1.

* * * * *